(12) United States Patent
Sameshima et al.

(10) Patent No.: US 10,222,245 B2
(45) Date of Patent: Mar. 5, 2019

(54) SENSOR DEVICE, MEASUREMENT SYSTEM, AND MEASUREMENT METHOD

(71) Applicant: OMRON Corporation, Kyoto-shi, Kyoto (JP)

(72) Inventors: Hiroshi Sameshima, Kyoto (JP); Yasuhiro Kawabata, Kyoto (JP); Tomohiro Ozaki, Tokyo (JP); Ryota Akai, Kyoto (JP); Teruki Hasegawa, Tokyo (JP)

(73) Assignee: OMRON Corporation, Kyoto (JP)

( * ) Notice: Subject to any disclaimer, the term of this patent is extended or adjusted under 35 U.S.C. 154(b) by 576 days.

(21) Appl. No.: 14/782,837

(22) PCT Filed: Feb. 4, 2014

(86) PCT No.: PCT/JP2014/052561
§ 371 (c)(1),
(2) Date: Oct. 7, 2015

(87) PCT Pub. No.: WO2014/167888
PCT Pub. Date: Oct. 16, 2014

(65) Prior Publication Data
US 2016/0041014 A1    Feb. 11, 2016

(30) Foreign Application Priority Data
Apr. 9, 2013 (JP) ................. 2013-081527

(51) Int. Cl.
*G01D 21/00* (2006.01)
*G01D 3/10* (2006.01)

(52) U.S. Cl.
CPC .............. *G01D 21/00* (2013.01); *G01D 3/10* (2013.01)

(58) Field of Classification Search
CPC .................................................... G06Q 10/06
(Continued)

(56) References Cited

U.S. PATENT DOCUMENTS 7,059,769 B1 *  6/2006  Potega ................ B60L 11/1861
                                                      338/22 R
2004/0184953 A1   9/2004  Litzie et al.
2008/0298796 A1  12/2008  Kuberka et al.
2009/0177907 A1   7/2009  Sotomayor, Jr. et al.
(Continued)

FOREIGN PATENT DOCUMENTS

CN    102110022 A    6/2011
CN    102232205 A   11/2011
(Continued)

OTHER PUBLICATIONS

International Search Report issued in PCT/JP2014/052561 dated May 13, 2014 (2 pages).
(Continued)

*Primary Examiner* — Ricky Ngon
(74) *Attorney, Agent, or Firm* — Osha Liang LLP

(57) ABSTRACT

A controller switches a measurement unit from a non-measurement state to a measurement state to start measurement processing of the measurement target physical amount when a trigger condition having a lowest variation level for a steady state is satisfied in plural trigger conditions set according to a trigger physical amount detected by a trigger detector, and the controller interrupts currently-performed measurement processing to start measurement processing corresponding to a trigger condition having a higher variation level when the trigger condition having the variation level for the steady state higher than that of the trigger condition corresponding to the currently-performed measurement processing is satisfied during performance of the measurement processing.

18 Claims, 16 Drawing Sheets

(58) Field of Classification Search
USPC ......... 702/45, 56, 60, 81, 94, 122, 127, 183, 702/188; 338/22 R; 705/14.1
See application file for complete search history.

(56) References Cited

U.S. PATENT DOCUMENTS

| | | |
|---|---|---|
| 2011/0169637 A1 | 7/2011 | Siegler, II et al. |
| 2012/0176234 A1 | 7/2012 | Taneyhill et al. |
| 2012/0271686 A1* | 10/2012 | Silverman ............. G06Q 10/06 705/14.1 |
| 2014/0128118 A1 | 5/2014 | Tomimatsu et al. |

FOREIGN PATENT DOCUMENTS

| | | |
|---|---|---|
| CN | 102612157 A | 7/2012 |
| CN | 102884559 A | 1/2013 |
| JP | H04-357419 A | 12/1992 |
| JP | 2007-334465 A | 12/2007 |
| JP | 2013-009079 A | 1/2013 |
| JP | 2013-009228 A | 1/2013 |
| JP | 2013-011963 A | 1/2013 |

OTHER PUBLICATIONS

Written Opinion of the International Searching Authority issued in PCT/JP2014/052561 dated May 13, 2014 (3 pages).
Extended European Search Report in counterpart European Application No. 14 78 2725.7 dated Dec. 14, 2016 (6 Pages).
First Office Action issued in corresponding Chinese Application No. 201480018163.0, dated Jul. 25, 2016 (9 pages).

* cited by examiner

FIG. 4

| Condition | | Priority |
|---|---|---|
| Current operation | Trigger threshold | |
| Under measurement | First threshold | 1 |
| | Second threshold | 2 |
| Under communication | First threshold | 1 |
| | Second threshold | 2 |

FIG. 9

| Condition | | | Priority |
|---|---|---|---|
| Current operation | Trigger threshold | Trigger generation source | |
| Under measurement | First threshold (TS1) | TS1 | 1 |
| | First threshold (TS2) | TS2 | 2 |
| | Second threshold (TS1) | TS1 | 3 |
| | Second threshold (TS2) | TS2 | 4 |
| Under communication | First threshold (TS1) | TS1 | 1 |
| | First threshold (TS2) | TS2 | 2 |
| | Second threshold (TS1) | TS1 | 3 |
| | Second threshold (TS2) | TS2 | 4 |

FIG. 10

| Condition | | | Priority |
|---|---|---|---|
| Current operation | Sensor TS1 | Sensor TS2 | |
| Under measurement | First threshold (TS1) | — | 1 |
| | First threshold (TS1) | First threshold (TS2) | 2 |
| | Second threshold (TS2) | — | 3 |
| | Second threshold (TS2) | First threshold (TS2) | 4 |
| Under communication | First threshold (TS1) | — | 1 |
| | First threshold (TS1) | First threshold (TS2) | 2 |
| | Second threshold (TS2) | — | 3 |
| | Second threshold (TS2) | First threshold (TS2) | 4 |

FIG. 11

| Condition | | | Priority |
|---|---|---|---|
| Current operation | Sensor TS1 | Sensor TS2 | |
| Under measurement | First threshold (TS1) | First threshold (TS1) | 1 |
| | First threshold (TS1) | Second threshold (TS2) | 2 |
| | Second threshold (TS2) | First threshold (TS1) | 3 |
| | Second threshold (TS2) | Second threshold (TS2) | 4 |
| Under communication | First threshold (TS1) | First threshold (TS1) | 1 |
| | First threshold (TS1) | Second threshold (TS2) | 2 |
| | Second threshold (TS2) | First threshold (TS1) | 3 |
| | Second threshold (TS2) | Second threshold (TS2) | 4 |

FIG. 12

| Current operation | Condition | | Priority |
|---|---|---|---|
| | Sensor TS1 | Sensor TS2 | |
| Under measurement | — | First threshold (TS1) | 1 |
| | — | Second threshold (TS2) | 2 |
| | First threshold (TS1) | — | 3 |
| | First threshold (TS1) | First threshold (TS1) | 4 |
| | First threshold (TS1) | Second threshold (TS2) | 5 |
| | Second threshold (TS1) | — | 6 |
| | Second threshold (TS1) | First threshold (TS1) | 7 |
| | Second threshold (TS1) | Second threshold (TS2) | 8 |
| Under communication | — | First threshold (TS1) | 1 |
| | — | Second threshold (TS2) | 2 |
| | First threshold (TS1) | — | 3 |
| | First threshold (TS1) | First threshold (TS1) | 4 |
| | First threshold (TS1) | Second threshold (TS2) | 5 |
| | Second threshold (TS1) | — | 6 |
| | Second threshold (TS1) | First threshold (TS1) | 7 |
| | Second threshold (TS1) | Second threshold (TS2) | 8 |

FIG. 14

| Condition | | | Priority |
|---|---|---|---|
| Current operation | Trigger threshold | Trigger generation source | |
| Under measurement | First threshold | Inside | 1 |
| | First threshold | Outside | 2 |
| | Second threshold | Inside | 3 |
| | Second threshold | Outside | 4 |
| Under communication | First threshold | Inside | 1 |
| | First threshold | Outside | 2 |
| | Second threshold | Inside | 3 |
| | Second threshold | Outside | 4 |

FIG. 16

| Condition | | | |
|---|---|---|---|
| Current operation | Trigger threshold | Trigger generation source | Priority |
| Under measurement | First threshold | Inside | 1 |
| | First threshold | Outside | 2 |
| | Timer interrupt | Inside | 3 |
| | Second threshold | Inside | 4 |
| | Second threshold | Outside | 5 |
| Under communication | First threshold | Inside | 1 |
| | First threshold | Outside | 2 |
| | Timer interrupt | Inside | 3 |
| | Second threshold | Inside | 4 |
| | Second threshold | Outside | 5 |

SENSOR DEVICE, MEASUREMENT SYSTEM, AND MEASUREMENT METHOD

CROSS-REFERENCE TO RELATED APPLICATION

This application is based on Japanese Patent Application No. 2013-081527 filed with the Japan Patent Office on Apr. 9, 2013, the entire contents of which are incorporated herein by reference.

FIELD

The present invention relates to a sensor device, a measurement system, and a measurement method for measuring a physical amount associated with a structure.

BACKGROUND

Conventionally a structural health monitoring technology is developed. In the structural health monitoring technology, a physical amount associated with a structure such as a bridge and a building is measured with a sensor device installed in the structure, and a degree or a generation place of damage or degradation is predicted based on a measurement result.

For example, Unexamined Japanese Patent Publication No. 2013-009079 discloses a sensor device including a measurement sensor that measures a measurement target physical amount and a starting sensor that detects a starting condition that starts the measurement sensor. In the sensor device, the measurement sensor is switched from a non-starting state to a starting state when the starting sensor detects the starting condition.

SUMMARY

However, in the technology of Unexamined Japanese Patent Publication No. 2013-009079, once the starting sensor detects the starting condition to start the measurement sensor, predetermined measurement processing is continued irrespective of generation of another event corresponding to the starting condition until the measurement processing corresponding to the initially-detected starting condition is completed, and the measurement sensor is switched to the non-starting state when the measurement processing is completed (see FIG. 2 of Unexamined Japanese Patent Publication No. 2013-009079).

Therefore, in the technology of Unexamined Japanese Patent Publication No. 2013-009079, after the measurement sensor is switched to the starting state to start the measurement processing, the measurement processing corresponding to another event is not performed in the case that the event satisfying the starting condition is generated before the measurement processing is completed.

The present invention is made in view of the problem described above, and an object of the present invention is to decrease energy consumption and to surely measure the physical amount corresponding to an event having a higher priority of the measurement even if the event is generated during the measurement processing in the sensor device that measures the physical amount associated with the structure.

According to one aspect of the present invention, a sensor device configured to measure a measurement target physical amount associated with a structure, the sensor device includes: a measurement unit configured to measure the measurement target physical amount; a trigger detector configured to detect a trigger physical amount; and a controller configured to control operation of the measurement unit according to a result of the trigger physical amount detected by the trigger detector. At this point, the controller switches the measurement unit from a non-measurement state to a measurement state to start measurement processing when a predetermined trigger condition is satisfied in plural trigger conditions set according to the trigger physical amount detected by the trigger detector, the controller sets a priority of each of the trigger conditions, and the controller interrupts currently-performed measurement processing to start measurement processing corresponding to a trigger condition having a higher priority when the trigger condition having the priority higher than that of the trigger condition corresponding to the currently-performed measurement processing is satisfied during the performance of the measurement processing.

In the sensor device according to one aspect of the present invention, a running time of the measurement unit is shortened to achieve energy saving, and the measurement target physical amount associated with the event having the higher priority can surely be measured.

BRIEF DESCRIPTION OF THE DRAWINGS

FIG. 4 is an explanatory view illustrating an example of setting information in the sensor device of FIG. 2;

FIG. 5(a) illustrates the outline of the measurement processing in a sensor device according to a comparative example, and FIG. 5(b) illustrates the outline of the measurement processing in the sensor device of FIG. 2;

FIG. 9 is an explanatory view illustrating an example of the setting information in the sensor device of FIG. 8;

FIG. 10 is an explanatory view illustrating another example of the setting information in the sensor device of FIG. 8;

FIG. 11 is an explanatory view illustrating still another example of the setting information in the sensor device of FIG. 8;

FIG. 12 is an explanatory view illustrating yet another example of the setting information in the sensor device of FIG. 8;

FIG. 14 is an explanatory view illustrating an example of the setting information in the sensor device of FIG. 13;

FIG. 16 is an explanatory view illustrating an example of the setting information in the sensor device of FIG. 15.

DETAILED DESCRIPTION

[First Embodiment]

(1-1. Configuration of Measurement System 1)

A first embodiment of the present invention will be described below.

Figure 1:
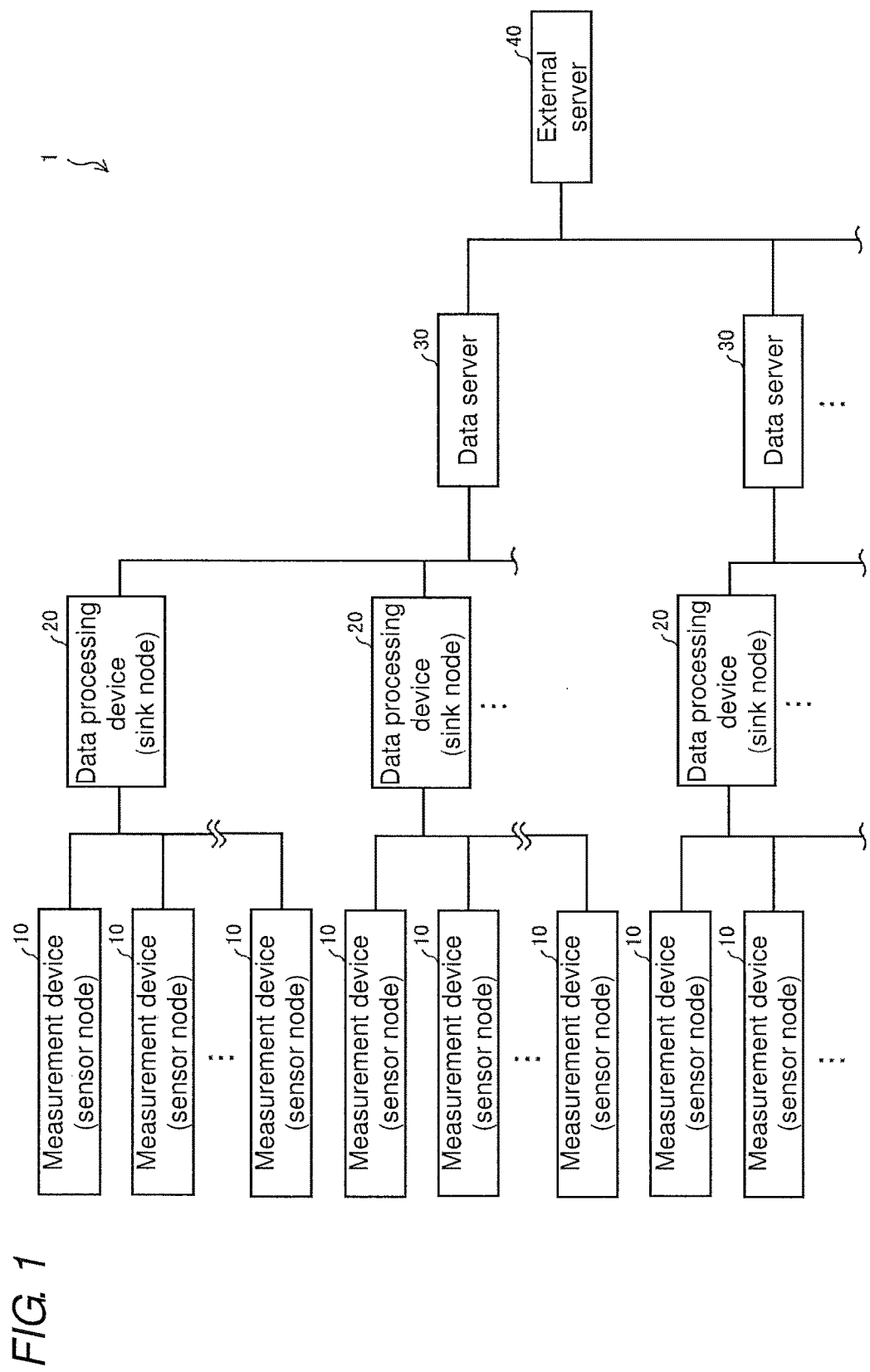
FIG. 1 is an explanatory view illustrating a schematic configuration of a measurement system according to a first embodiment of the present invention.

FIG. 1 is an explanatory view illustrating a schematic configuration of a measurement system 1 according to the first embodiment. As illustrated in FIG. 1, the measurement system 1 includes a sensor device (sensor node) 10, a data processing device (sink node) 20, a data server 30, and an external server 40.

The sensor device 10 measures a predetermined measurement target physical amount associated with a structure of a measurement target, and transmits measured data indicating a measurement result to the data processing device 20. Examples of the measurement target physical amount include acceleration, a displacement, a strain, a vibration frequency, a temperature, humidity, a pressure, an infrared amount, volume, illuminance, and a wind speed. In the first embodiment, the sensor devices 10 are installed at plural places different from each other in a structure of a measurement target to measure the measurement target physical amounts associated with the plural places of the structure. There is no particular limitation to a kind of the structure. For example, the first embodiment can be applied to various structures such as a building, a bridge, a tunnel, a house, a vehicle, a plant facility, a pipeline, an electric cable, a telegraph pole, a gas supply facility, a water and sewerage facility, and a ruin.

Figure 2:
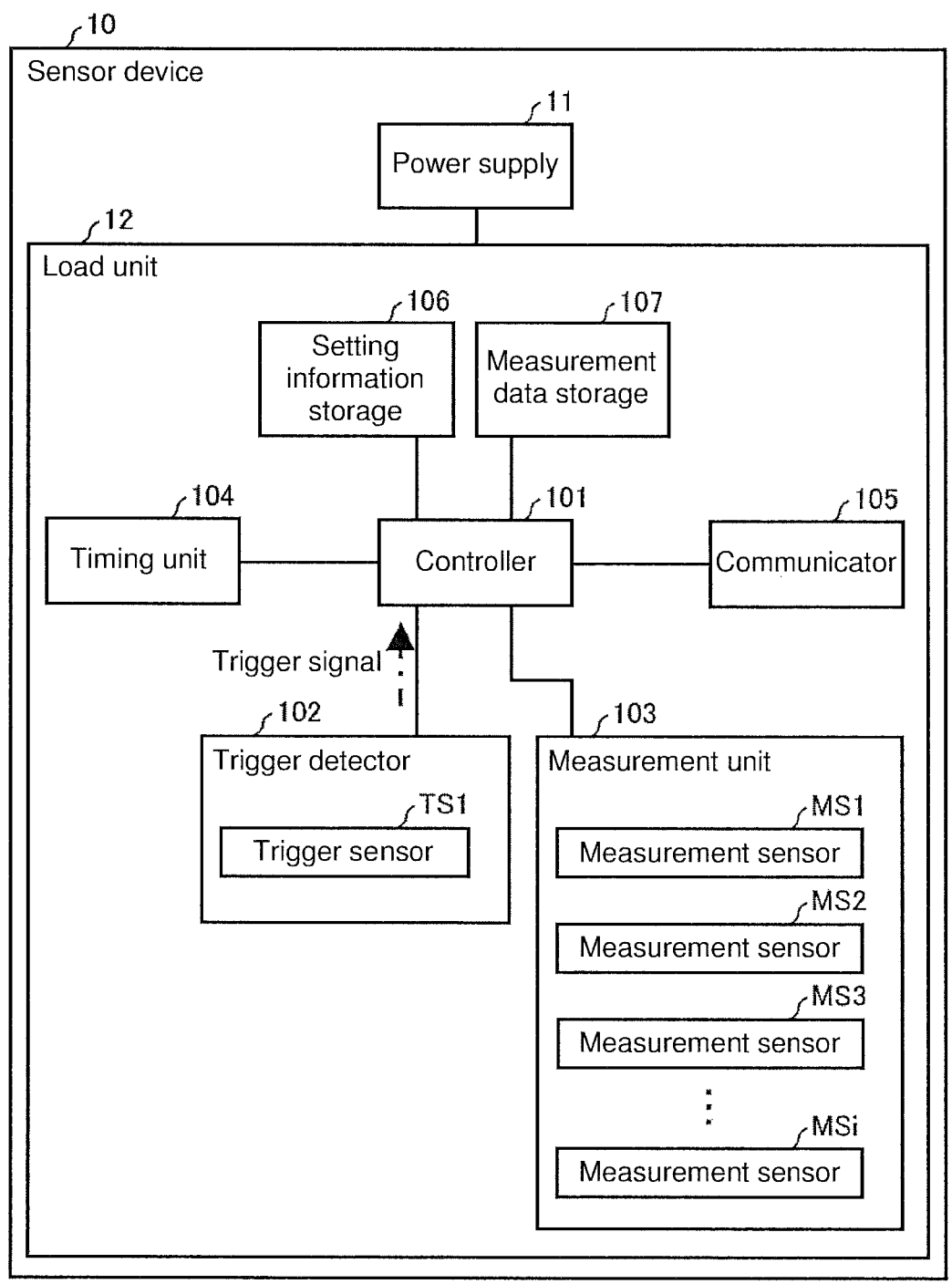
FIG. 2 is an explanatory view illustrating a schematic configuration of a sensor device included in the measurement system of FIG. 1.

Specifically, as illustrated in FIG. 2, the sensor device 10 includes a power supply 11 and a load unit 12, and the load unit 12 includes a controller 101, a trigger detector 102, a measurement unit 103, a timing unit 104, a communicator 105, a setting information storage 106, and a measurement data storage 107.

The power supply 11 supplies power to the load unit 12 in order to drive each unit of the load unit 12. In the first embodiment, the power supply 11 includes a battery (not illustrated), and supplies the power stored in the battery to each unit of the load unit 12. Alternatively, the power supply 11 may receive the power (such as commercial power and power generated by a power generation facility) supplied from the outside of the sensor device 10, and may supply the power to each unit of the load unit 12.

The controller 101 controls operation of each unit of the load unit 12. Examples of the operation include drive and stopping of each unit, data acquisition from each unit, storage of acquired data, communication with the data processing device 20, and a setting of a trigger threshold (trigger condition). For example, the controller 101 is constructed with a CPU (Central Processing Unit). The controller 101 controls the operation of each unit of the load unit 12 based on a program and various pieces of data, which are stored in a storage unit (not illustrated) such as a ROM. However, the configuration of the controller 101 is not limited to the first embodiment. For example, the controller 101 may be constructed with a hardware logic, or the controller 101 may be constructed with a combination of hardware partially performing processing and a calculation unit executing software performing control of the hardware and remaining processing.

The trigger detector 102 includes a trigger sensor TS1 that detects a predetermined trigger physical amount (such as acceleration, a displacement, a strain, a vibration frequency, a temperature, humidity, a pressure, an infrared amount, volume, illuminance, and a wind speed) of the structure of the measurement target or around the structure. The trigger detector 102 outputs a trigger signal to the controller 101 in the case that a predetermined trigger condition is satisfied, namely, in the case that a detection value of the trigger physical amount satisfies the predetermined trigger condition. Therefore, the controller 101 controls the operation (such as switching between a non-measurement state and a measurement state) of the measurement unit 103 based on the trigger signal input from the trigger detector 102. Alternatively, the trigger detector 102 outputs the detection value of the trigger sensor TS1 to the controller 101, the controller 101 compares the detection value of the trigger sensor TS1 to a previously-fixed trigger threshold (trigger condition), and the operation of the measurement unit 103 may be controlled based on a comparison result.

In the first embodiment, an acceleration sensor that detects the acceleration caused by the vibration is mainly described as the trigger sensor TS1. However, there is no particular limitation to the configuration of the trigger sensor TS1 as long as the trigger physical amount can be detected. Desirably power consumption of the trigger sensor TS1 is less than power consumption of each measurement sensor included in the measurement unit 103 (or a total of power consumption of the measurement sensors).

The measurement unit 103 includes measurement sensors MS1 to MSi (i is an integer of 2 or more) that measure the measurement target physical amounts associated with the structure of the measurement target, and outputs the measurement result (measured data) of each measurement sensor to the controller 101. Examples of the measurement target physical amount include acceleration, a displacement, a strain, a vibration frequency, a temperature, humidity, a pressure, an infrared amount, volume, illuminance, and a wind speed. The controller 101 sequentially stores the measured data input from the measurement unit 103 in the measurement data storage 107, reads the measured data stored in the measurement data storage 107 in predetermined timing, and transmits the measured data to the data processing device 20 through the communicator 105.

In the first embodiment, the measurement unit 103 includes the measurement sensors MS1 to MSi, and the physical amounts different from each other are measured with the measurement sensors MS1 to MSi. Alternatively, for example, the measurement unit 103 may include only one measurement sensor to measure the one kind of the physical amount. Alternatively, the measurement target physical amount measured with the measurement unit 103 may be identical to or different from the trigger physical amount measured with the trigger detector 102.

In the first embodiment, the controller 101 causes the measurement unit 103 not to perform the measurement processing (measurement unit 103 is put into the non-measurement state) unless the predetermined trigger condition is generated, and the controller 101 causes the measurement unit 103 to start the measurement processing (measurement unit 103 is put into the measurement state) when the predetermined trigger condition is generated. Therefore, an operating time of the measurement unit 103 is shortened to decrease the power consumption, and a lifetime of the battery included in the power supply 11 is lengthened.

In response to the instruction of the controller 101, the timing unit 104 measures an elapsed time from the predetermined timing. For example, the controller 101 causes the timing unit 104 to measure the elapsed time since the measurement unit 103 starts the measurement processing, and the controller 101 causes the measurement unit 103 to end the measurement processing when a predetermined time elapses. The timing unit 104 may have a function of timing a date and a clock time.

The communicator 105 conducts wireless communication with other devices (such as the data processing device 20). For example, in response to the instruction of the controller 101, the communicator 105 transmits the measured data stored in the measurement data storage 107 to the data processing device 20. The communicator 105 receives a trigger condition setting instruction from the data processing device 20 (or the data server 30), and outputs the trigger condition setting instruction to the controller 101. In the first embodiment, the communicator 105 conducts the wireless communication with the data processing device 20. However, there is no particular limitation to the communication method. For example, the communicator 105 may conduct wired communication with the data processing device 20.

Various pieces of setting information are stored in the setting information storage 106. Examples of the setting information include operating parameters (operating conditions such as a measurement time and a frequency) or correction values of the operating parameters of the trigger detector 102 and measurement unit 103 and a condition (trigger condition) that the measurement unit 103 starts the measurement processing. In the first embodiment, a non-volatile memory is used as the setting information storage 106. The disposition position of the setting information storage 106 is not limited to the example in FIG. 2. For example, the setting information storage 106 may be provided in the trigger detector 102.

The measured data measured with the measurement unit 103 is stored in the measurement data storage 107. In the first embodiment, a volatile memory is used as the measurement data storage 107, and the measured data temporarily stored in the measurement data storage 107 is transmitted to the data processing device 20 through the communicator 105 in response to an instruction of the controller 101. The measured data that is already transmitted to the data processing device 20 is properly deleted from the measurement data storage 107.

As illustrated in FIG. 1, the data processing device 20 communicates with the plural sensor devices 10 and the data server 30, performs data processing such as aggregation and analysis based on the measured data received from the sensor device 10, and transmits a data processing result to the data server 30. The data processing device 20 may directly transmit the measured data received from each sensor device 10 to the data server 30. There is no particular limitation to the communication method between the data processing device 20 and the data server 30, but the data processing device 20 and the data server 30 may conduct the wireless or wired communication with each other.

The external server 40 can communicate with plural data servers 30, and the data processing result received from each data processing device 20 is stored in the external server 40. The external server 40 receives an instruction to input various pieces of setting information from a manager of the measurement system 1, and transmits the setting information corresponding to the input instruction to each device of the measurement system 1. For example, the external server 40 receives an instruction to input various pieces of setting information such as the operating parameter or correction value of the measurement unit 103 of each sensor device 10 and the condition that starts the measurement processing, and the external server 40 transmits the setting information corresponding to the input instruction to each sensor device 10 through the data server 30 and the data processing device 20.

In the first embodiment, the measurement system 1 includes the data processing device 20, the data server 30, and the external server 40. Alternatively, some of or all the data processing device 20, the data server 30, and the external server 40 may be common to each other.

( 1-2. Operation Control of Measurement Unit 103)

Figure 3:
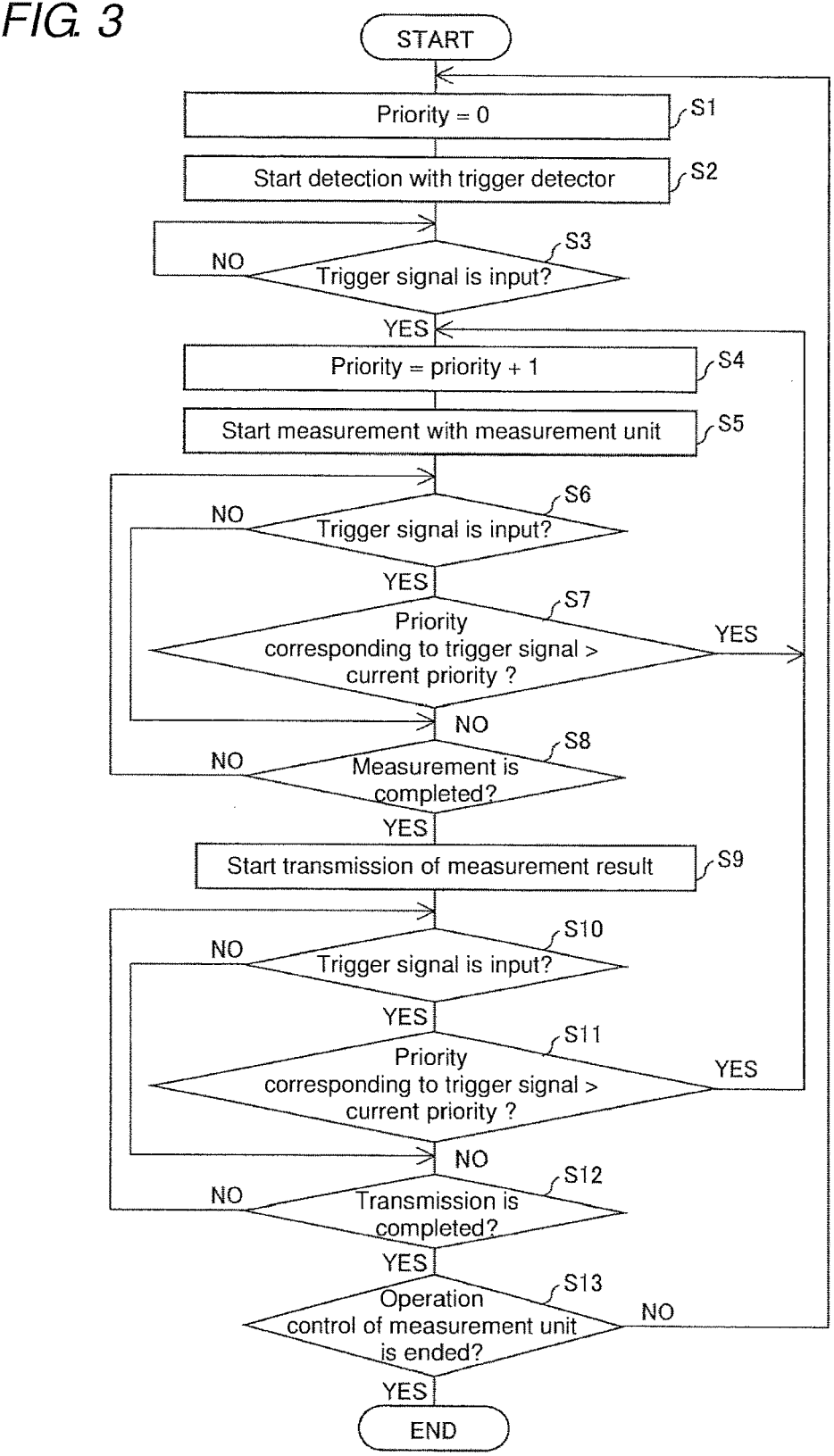
FIG. 3 is a flowchart illustrating a flow of measurement processing in the sensor device of FIG. 2.

A method for controlling operation of the measurement unit 103 will be described below with reference to FIG. 3. FIG. 3 is a flowchart illustrating a flow of the operation control of the measurement unit 103.

In the first embodiment, the setting information used in the operation control is stored in the setting information storage 106 before the operation control of the measurement unit 103 is started.

FIG. 4 is an explanatory view illustrating an example of the setting information stored in the setting information storage 106. In the example of FIG. 4, a first threshold and a second threshold are set as the trigger threshold (trigger condition), and a priority is set while correlated with each threshold and the operating state of the sensor device 10. The first threshold and the second threshold are a value associated with the same kind of physical amount, and the second threshold is set larger than the first threshold in a variation value for a steady state (normal state). For example, in the case that the trigger physical amount is the acceleration, an absolute value of the second threshold is set larger than that of the first threshold when the normal state in which the vibration is not generated is set to zero. More specifically, for example, the first threshold is set to the acceleration corresponding to the daily-generated vibration such as a traffic load (a load generated by passage of a vehicle) and wind, and the second threshold is set to the acceleration corresponding to the unexpectedly-generated vibration such as an earthquake of a predetermined seismic intensity or more.

In the example of FIG. 4, the two kinds of the trigger thresholds (the first threshold and the second threshold) are set. The number of trigger thresholds is not limited to the example of FIG. 4, but at least three kinds of the trigger thresholds (first to n-th threshold (n is an integer of 3 or more)) may be set. In such cases, the variation value for the normal state is set in the ascending order of the first threshold, the second threshold, the third threshold, . . . , and the n-th threshold.

The controller 101 initializes the priority (current priority) stored in the setting information storage 106 (sets the priority to zero) (S1), starts the detection of the trigger physical amount while setting the trigger threshold (trigger condition) of the trigger detector 102 (S2), and monitors the input of the trigger signal (S3). In the case that the detection result of the trigger sensor TS1 satisfies the trigger condition set by the controller 101, the trigger detector 102 outputs the detected trigger signal corresponding to the trigger condition to the controller 101. The controller 101 stores the setting value (current priority) of the priority in the setting information storage 106, and properly updates the setting value of the priority according to the detection result of the trigger condition.

When the trigger signal is input from the trigger detector 102, the controller 101 increments the priority by 1 (S4), and causes the measurement unit 103 to start the measurement of the physical amount (S5). That is, the measurement unit 103 is switched from the non-measurement state to the measurement state. In the first embodiment, the controller 101 causes the timing unit 104 to time the elapsed time since the measurement unit 103 starts the measurement processing, and the controller 101 causes the measurement unit 103 to perform the measurement processing until the elapsed time reaches a predetermined time as long as another trigger condition is not satisfied.

The controller 101 monitors the detection of the trigger signal while the measurement unit 103 performs the measurement (S6).

When the trigger signal is determined to be input in S6, the controller 101 determines whether the priority of the trigger condition corresponding to the input trigger signal is higher than the current priority (S7).

When the priority of the trigger condition corresponding to the input trigger signal is determined to be higher than the current priority in S7, the controller 101 returns to the processing in S4. That is, the controller 101 returns to S4 to increment the priority by 1, causes the measurement unit 103 to start the measurement of the physical amount in S5 (the elapsed time since the starting of the measurement is reset to zero, and starts the timing of the elapsed time), and performs the pieces of processing from S6.

On the other hand, when the trigger signal is not determined to be input in S6, and when the priority of the trigger condition corresponding to the input trigger signal is less than or equal to the current priority in S7, the controller 101 determines whether the measurement unit 103 completes the measurement processing (S8). In the first embodiment, as described above, the measurement processing is completed when the elapsed time since the starting of the measurement processing performed by the measurement unit 103 reaches the predetermined time.

When the measurement processing is not determined to be completed in S8, the controller 101 returns to the processing in S6.

On the other hand, when the measurement processing is determined to be completed in S8, the controller 101 starts the processing of transmitting the measurement result to the data processing device 20 (S9). Specifically, the controller 101 sequentially stores the measurement result (measured data) of the measurement unit 103 in the measurement data storage 107, reads the measured data stored in the measurement data storage 107 when the measurement unit 103 completes the measurement processing, and causes the communicator 105 to transmit the measured data to the data processing device 20.

The controller 101 monitors the input of the trigger signal while the measured data is transmitted (S10).

When the trigger signal is determined to be input in S10, the controller 101 determines whether the priority corresponding to the input trigger signal is higher than the current priority (S11).

When the priority corresponding to the input trigger signal is determined to be higher than the current priority in S11, the controller 101 returns to the processing in S4. That is, the controller 101 returns to S4 to increment the priority by 1, causes the measurement unit 103 to start the measurement of the physical amount in S5 (the elapsed time since the starting of the measurement is reset to zero, and starts the timing of the elapsed time), and performs the pieces of processing from S6.

On the other hand, when the trigger signal is not determined to be input in S10, and when the priority corresponding to the trigger signal is determined to be less than or equal to the current priority in S11, the controller 101 determines whether the processing of transmitting the measured data is completed (S12).

When the transmission processing is not completed in S12, the controller 101 returns to the processing in S10.

On the other hand, when the transmission processing is completed in S12, the controller 101 determines whether the operation control of the measurement unit 103 is ended, and the controller 101 returns to the processing in S1 when the operation control of the measurement unit 103 is not ended.

(1-3. Summary of First Embodiment)

As described above, in the sensor device 10 of the first embodiment, the measurement unit 103 is maintained in the non-measurement state until the predetermined trigger condition is satisfied, and the measurement unit 103 is switched from the non-measurement state to the measurement state to start the processing of measuring the measurement target physical amount when the predetermined trigger condition is satisfied.

Therefore, the running time of the measurement unit 103 can be shortened to achieve the energy saving. Accordingly, an exchange frequency or a charging frequency of the battery included as the power supply of the sensor device 10 can be decreased. In the case that the power of the power supply of the sensor device 10 is received from the outside, running cost can be reduced by decreasing the power consumption of each sensor device 10.

In the sensor device 10 of the first embodiment, the priority is correlated with each trigger condition while the plural trigger conditions are set, and the measurement processing or transmission processing of the measurement target physical amount is performed while a certain trigger condition is satisfied. At this point, in the case that a new trigger condition having a priority higher than that of the current trigger condition is satisfied, the currently-performed measurement processing or transmission processing is interrupted, and the measurement processing and transmission processing corresponding to the trigger condition having the higher priority are performed from the start.

Therefore, in the case that the trigger condition having the higher priority is generated while the measurement processing or transmission processing is performed, the measurement processing and transmission processing corresponding to the trigger condition having the higher priority can surely be performed.

Figure 5:
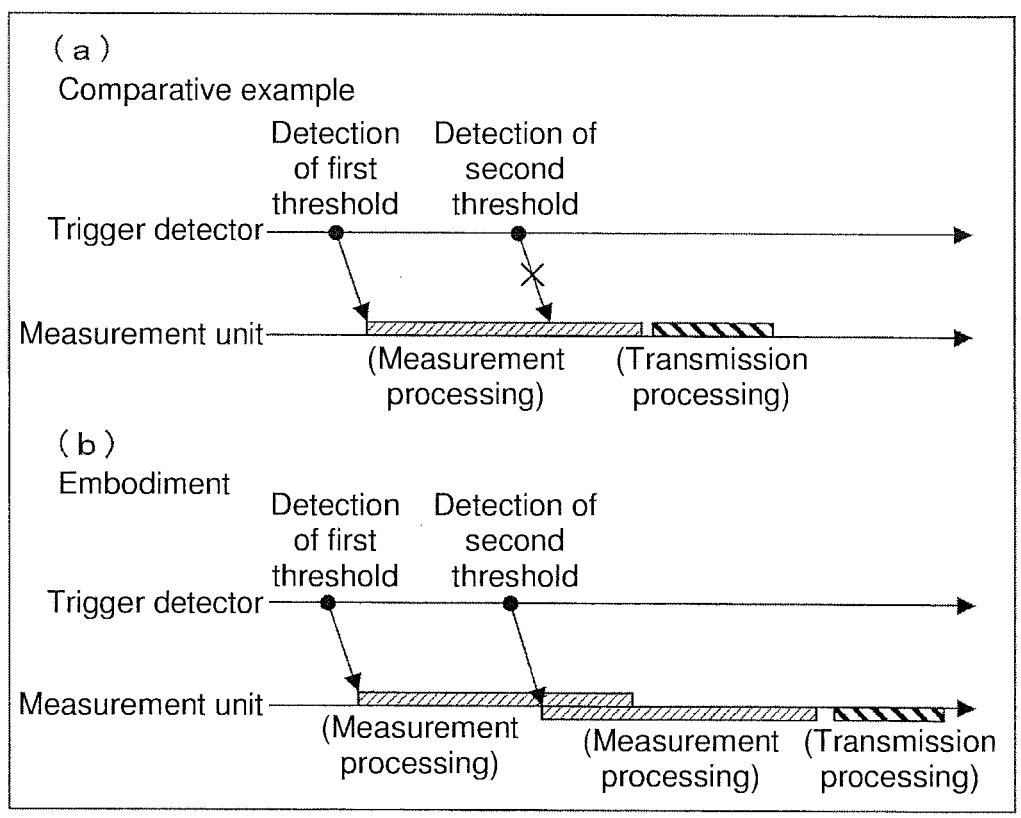
FIG. 5 is an explanatory view illustrating an outline of measurement processing in a sensor device.

In the conventional technology (comparative example), as illustrated in FIG. 5(a), once the first threshold is detected to start the measurement processing, even if another trigger (second threshold) is generated, another trigger is not considered until the measurement processing and the corresponding transmission processing are completed, but only the measurement processing and transmission processing corresponding to the initially-detected first threshold are performed. Therefore, in the case that the event having the higher priority is newly generated while the measurement processing and the transmission processing are performed, the measurement processing associated with the newly-generated event is not properly performed.

On the other hand, in the first embodiment, as illustrated in FIG. 5(b), in the case that the second threshold is detected during the measurement processing or the corresponding transmission processing after the first threshold is detected to start the measurement processing, the measurement processing and transmission processing corresponding to the first threshold are interrupted, and the measurement processing and transmission processing corresponding to the second threshold are performed from the start. Therefore, the measured data corresponding to the trigger condition having the higher priority can surely be obtained.

More specifically, for example, in the case that the structure of the measurement target is a bridge or an elevated road, the first threshold is set to a value corresponding to the vibration steadily generated by a traffic load (a load caused by vehicle running) or wind, and the second threshold is set to a value corresponding to the vibration generated by an unexpected earthquake. Therefore, a response of the structure can be monitored with respect to the vibration steadily generated by the vehicle running or wind to recognize accumulation of a fatigue or a degree of advance of degradation, and a response of the structure can surely be measured with respect to the unexpected vibration such as the earthquake to serve a determination of necessity of traffic control such as road closed or necessity of maintenance and repair.

(1-4. Modifications of First Embodiment)

(1-4-1. Deletion of Stored Measured Data)

In the first embodiment, the measured data measured by the measurement unit 103 is sequentially stored in the measurement data storage 107. Alternatively, in the case that a trigger condition (trigger condition B) having a higher priority is satisfied to start the measurement processing and the transmission processing from the start while the measurement processing and transmission processing corresponding to a trigger condition (trigger condition A) are performed, the measured data corresponding to the trigger condition B may preferentially be stored in the measurement data storage 107 while the measured data corresponding to the trigger condition A is deleted from the measurement data storage 107.

Therefore, even if there is a restriction to a storage capacity of the measurement data storage 107, the measured data corresponding to the trigger condition having the higher priority can properly be stored.

In the pieces of measured data stored in the measurement data storage 107, the measured data in which the transmission processing to the data processing device 20 is completed may sequentially be deleted.

(1-4-2. Modification of Measurement Ending Condition)

In the first embodiment, the measurement processing is ended when the predetermined measurement time elapses since the measurement is started. Alternatively, the timing in which the measurement processing of the measurement unit 103 is ended is not limited to the first embodiment. For example, after the measurement processing is started, the controller 101 may monitor the measurement result of the measurement unit 103, and may end the measurement when a state in which a variation width of the measurement target physical amount converges on a predetermined value or less is continued for a predetermined time or more.

(1-4-3. Setting of Measurement Condition in Each Trigger Condition)

In the first embodiment, the measurement condition of the measurement processing corresponding to each trigger condition is fixedly set. Alternatively, the measurement condition (such as the measurement time, the measurement target physical amount, a measurement range, a sampling frequency, and the ending condition of the measurement processing) may be varied in each trigger condition (or each priority).

Specifically, for example, the measurement time performed in detecting the first threshold may be set to 1 minute, and the measurement time performed in detecting the second threshold may be set to 5 minute. In the case that the measurement target physical amount is the acceleration, the measurement range may be set to ±3 G when the first threshold is detected, and the measurement range may be set to ±1 G when the second threshold is detected. The sampling frequency may be set to 100 Hz when the first threshold is detected, and the sampling frequency may be set to 200 Hz when the second threshold is detected.

Therefore, for example, the measurement condition with the reduced power consumption is used in the case that the high-accuracy measurement is not required, and the measurement condition in which the high-accuracy measurement can be performed is used in the case that the high-accuracy measurement is required. Therefore, the measurement condition can properly be set according to the degree, kind, or priority of the trigger condition.

Figure 6:
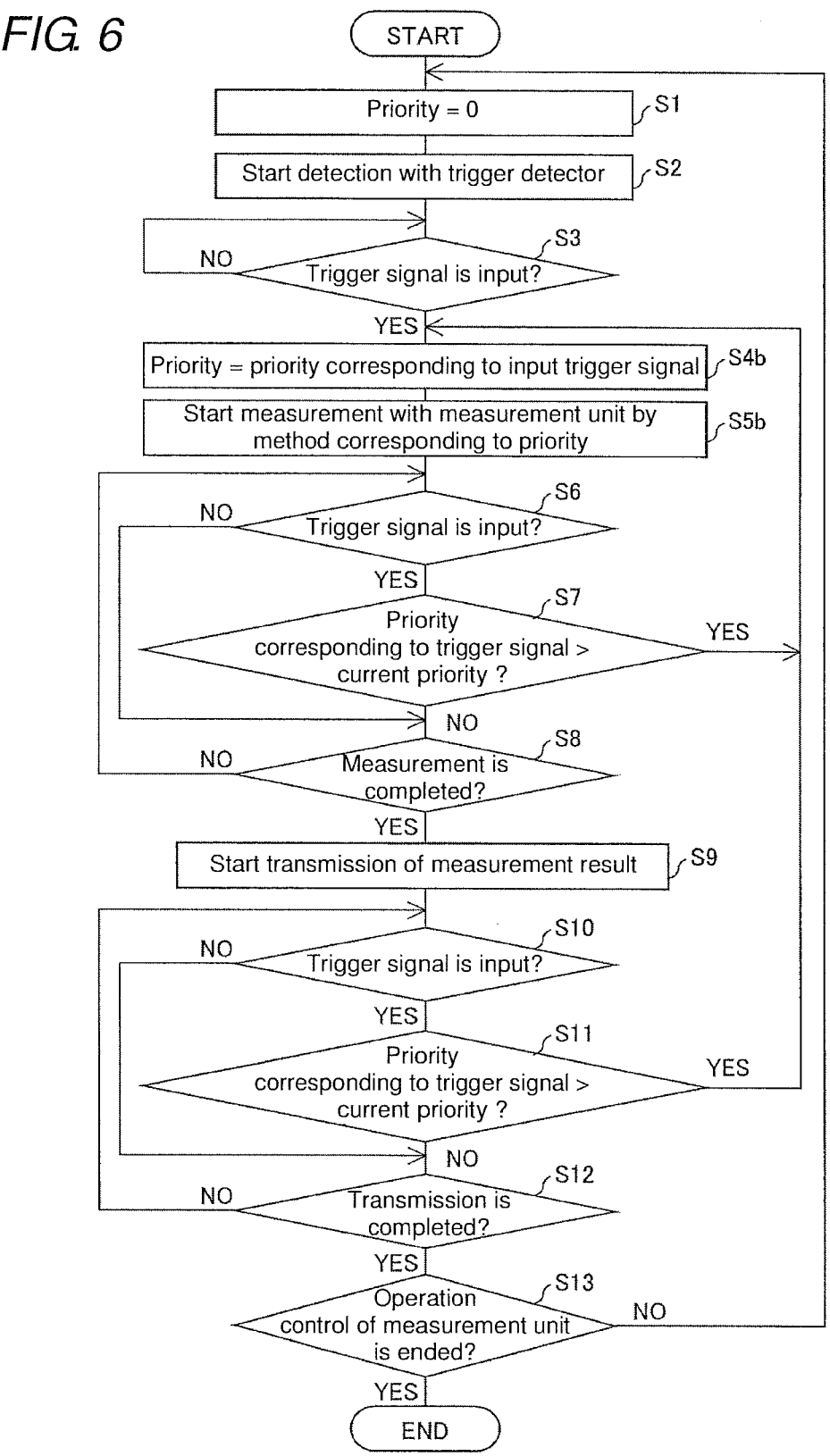
FIG. 6 is a flowchart illustrating a modification of the measurement processing in the sensor device of FIG. 2.

FIG. 6 is a flowchart illustrating a flow of the processing when the measurement condition varies in each priority. In FIG. 6, for convenience of the description, the processing similar to that illustrated in the flowchart of FIG. 3 is designated by the same numeral (step number), and the description is omitted.

The flowchart of FIG. 6 differs from that of FIG. 3 in that Steps S4b and S5b are performed in FIG. 6 instead of steps S4 and S5 in FIG. 3.

In the example of FIG. 6, the measurement condition corresponding to each trigger condition is previously stored in the setting information storage 106. The priority (the trigger signal detected in S3, the trigger signal input in S6 in which the priority is determined to be higher than that of the current priority in S7, or the priority corresponding to the trigger signal input in S10 in which the priority is determined to be higher than that of the current priority in S11) corresponding to the trigger signal in which the priority is input is set in S4b. In S5b, the measurement processing is started on the measurement condition corresponding to the priority set in S4b.

Alternatively, the measurement condition is set in each trigger condition, and the measurement processing may be started on the measurement condition corresponding to the trigger condition indicated by the input trigger signal (the trigger signal detected in S3, the trigger signal input in S6 in which the priority is determined to be higher than that of the current priority in S7, or the trigger signal input in S10 in which the priority is determined to be higher than that of the current priority in S11) in S5b.

(1-4-4. For One Settable Trigger Threshold)

Figure 7:
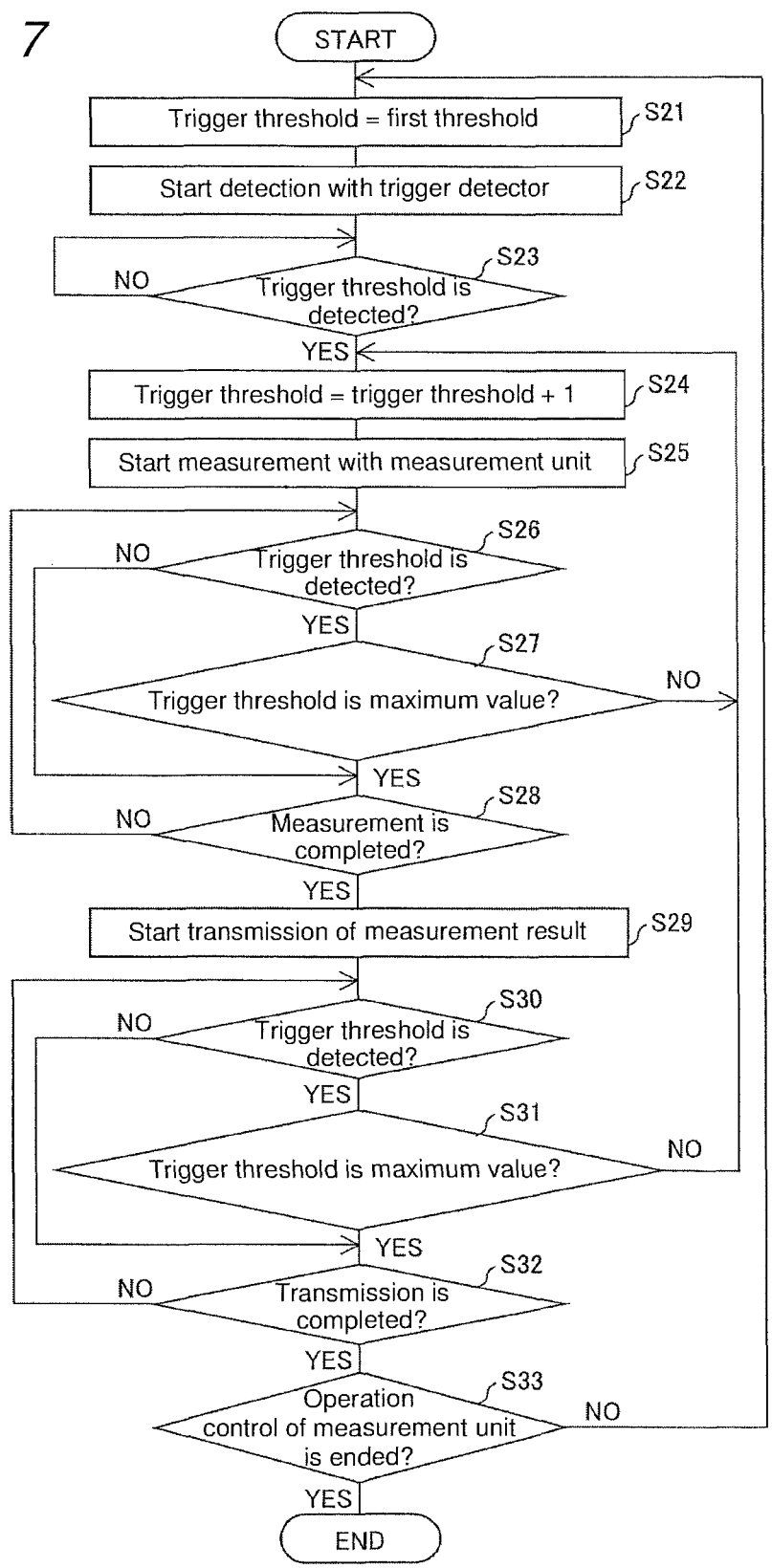
FIG. 7 is a flowchart illustrating a modification of the measurement processing in the sensor device of FIG. 2.

In the first embodiment, the priority is set while correlated with each trigger condition. Alternatively, for example, only one settable trigger threshold is used in the trigger detector 102 during the same period, and a level of the trigger threshold set to the trigger detector 102 may be incremented by 1 every time the set trigger threshold is detected. FIG. 7 is a flowchart illustrating a flow of the processing in that case.

The controller 101 initializes the trigger threshold set to the trigger detector 102 (to the threshold having the smallest variation width in the normal state) (S21), and the controller 101 causes the trigger detector 102 to start the detection of the trigger physical amount (S22).

The controller 101 monitors the trigger detector 102 that detects the currently-set trigger threshold (S23).

When the trigger detector 102 detects the currently-set trigger threshold, the controller 101 increments the trigger threshold of the trigger detector 102 by 1 (sets the currently-set trigger threshold to one in which the variation width in the normal state is incremented by 1) (S24), and the measurement unit 103 starts the measurement of the physical amount (S25).

The controller 101 monitors the trigger detector 102 that detects the currently-set trigger threshold during the measurement of the measurement unit 103 (S26).

When the trigger threshold is determined to be detected in S26, the controller 101 determines whether the detected trigger threshold is a maximum value in plural previously-fixed levels of trigger thresholds settable to the trigger detector 102 (S27).

When the detected trigger threshold is not determined to be the maximum value in S27, the controller 101 returns to the processing in S24. That is, the controller 101 returns to S24 to increment the trigger threshold by 1, causes the measurement unit 103 to start the measurement of the physical amount in S25, and performs the pieces of processing from S26.

On the other hand, when the trigger threshold is not determined to be detected in S26, and when the detected trigger threshold is determined to be the maximum value in S27, the controller 101 determines whether the measurement unit 103 completes the measurement processing (S28).

When the measurement processing is not determined to be completed in S28, the controller 101 returns to the processing in S26.

On the other hand, when the measurement processing is determined to be completed in S28, the controller 101 starts the processing of transmitting the measurement result to the data processing device 20 (S29).

The controller 101 monitors the trigger detector 102 that detects the currently-set trigger threshold during the transmission of the measured data (S30).

When the trigger threshold is determined to be detected in S30, the controller 101 determines whether the detected trigger threshold is the maximum value in plural previously-fixed levels of trigger thresholds settable to the trigger detector 102 (S31).

When the detected trigger threshold is not determined to be the maximum value in S31, the controller 101 returns to the processing in S24.

On the other hand, when the trigger threshold is not determined to be detected in S30, and when the trigger threshold is determined to be the maximum value in S31, the controller 101 determines whether the processing of transmitting the measured data is completed (S32).

When the measurement processing is not determined to be completed in S32, the controller 101 returns to the processing in S30.

On the other hand, when the measurement processing is determined to be completed in S32, the controller 101 determines whether the operation control of the measurement unit 103 is ended, and the controller 101 returns to the processing in S21 when the operation control of the measurement unit 103 is not ended.

Therefore, even if only one settable trigger threshold is used in the trigger detector 102 during the same period, the processing of measuring the measurement target physical amount can properly be performed according to the priority of the event generated in the structure.

(1-4-5. Method for Changing Setting of Trigger Condition—1)

In the first embodiment, the plural trigger thresholds are previously stored in the setting information storage 106, and the measurement operation of the measurement unit 103 is controlled using the trigger thresholds. Alternatively, a manager of the measurement system 1 may arbitrarily change a part or whole of the trigger threshold (the trigger threshold set to the trigger detector 102) stored in the setting information storage 106.

For example, the manager of the measurement system 1 inputs an instruction to the external server 40 to change the trigger threshold, and the instruction to change the trigger threshold is transmitted from the external server 40 to the sensor device 10 through the data server 30 and the data processing device 20, whereby the controller 101 of the sensor device 10 may change values of the plural trigger thresholds (the trigger thresholds set to the trigger detector 102) stored in the setting information storage 106.

Alternatively, the manager of the measurement system 1 may input the instruction to change the trigger threshold through the data server 30 or the data processing device 20, or the manager may input the instruction to the sensor device 10 to change the trigger threshold.

Therefore, for example, the manager of the measurement system 1 can reset the trigger threshold by referring to or carefully checking the measurement result of the measurement target physical amount in each sensor device 10. The trigger threshold may be changed while the sensor device 10 is stopped or operated.

(1-4-6. Method for Changing Setting of Trigger Condition—2)

In the first embodiment, the measurement operation of the measurement unit 103 is controlled using the trigger threshold (or the trigger threshold changed by the manager of the measurement system 1) previously stored in the setting information storage 106. Alternatively, the data processing device 20 (or the controller 101, the data server 30, or the external server 40) may automatically decide the trigger threshold that is used to control the measurement operation based on a predetermined condition.

For example, the data processing device 20 (or the controller 101 of the sensor device 10, the data server 30, or the external server 40) may decide the trigger threshold based on the past measurement result (for example, the measurement result for last several days) such that an occurrence frequency of the measurement processing per predetermined period (for example, per one day) becomes a predetermined condition (for example, less than or equal to a predetermined value, or a predetermined numerical range). In this case, in the case that the occurrence frequency of the measurement processing is excessively high, the data processing device 20 sets the trigger threshold to a value higher than that before the change of the trigger threshold in order to decrease the occurrence frequency of the measurement processing (for example, the variation value of the trigger physical amount in the normal state is changed to larger one), and in the case that the occurrence frequency of the measurement processing is excessively low, the data processing device 20 sets the trigger threshold to a value lower than that before the change of the trigger threshold in order to increase the occurrence frequency of the measurement processing (for example, the variation value of the trigger physical amount in the normal state is changed to smaller one). There is no particular limitation to the method for setting the trigger threshold based on the past measurement result and the occurrence frequency of the desired measurement processing. For example, a well-known method disclosed in Unexamined Japanese Patent Publication No. 2012-79106 can be adopted.

The controller 101 may automatically set the trigger condition based on various conditions such as sunlight hours (dawn and/or sunset), a temperature, humidity, a season, and a day of the week and setting rule of the previously-set trigger condition.

There is no particular limitation to the timing in which the controller 101 updates (automatically sets) the trigger condition. For example, the controller 101 may update the trigger condition in each predetermined period (such as each predetermined elapsed time, each predetermined clock time, and each predetermined number of days), the controller 101 may update the trigger condition every time the trigger detector 102 or measurement unit 103 of the predetermined sensor device 10 detects a predetermined event, the controller 101 may update the trigger condition every time the aggregation and analysis result of the measured data satisfies a predetermined condition, or the controller 101 may update the trigger condition when the manager of the sensor device 10 issues the instruction to change the setting.

(1-4-7. Trigger Condition During Measurement Different from Trigger Condition During Transmission)

In the first embodiment, the trigger condition and the priority that are used in the period in which the measurement unit 103 measures the measurement target physical amount (measurement processing period) are common to the trigger condition and the priority that are used in the period in which the communicator 105 transmits the measured data (transmission processing period). Alternatively, the trigger condition and the priority that are used in the measurement processing period may be different from the trigger condition and the priority that are used in the transmission processing period.

[Second Embodiment]

A second embodiment of the present invention will be described below. For convenience of the description, the member having the same function as the first embodiment is designated by the same numeral as the first embodiment, and the description is omitted.

Figure 8:
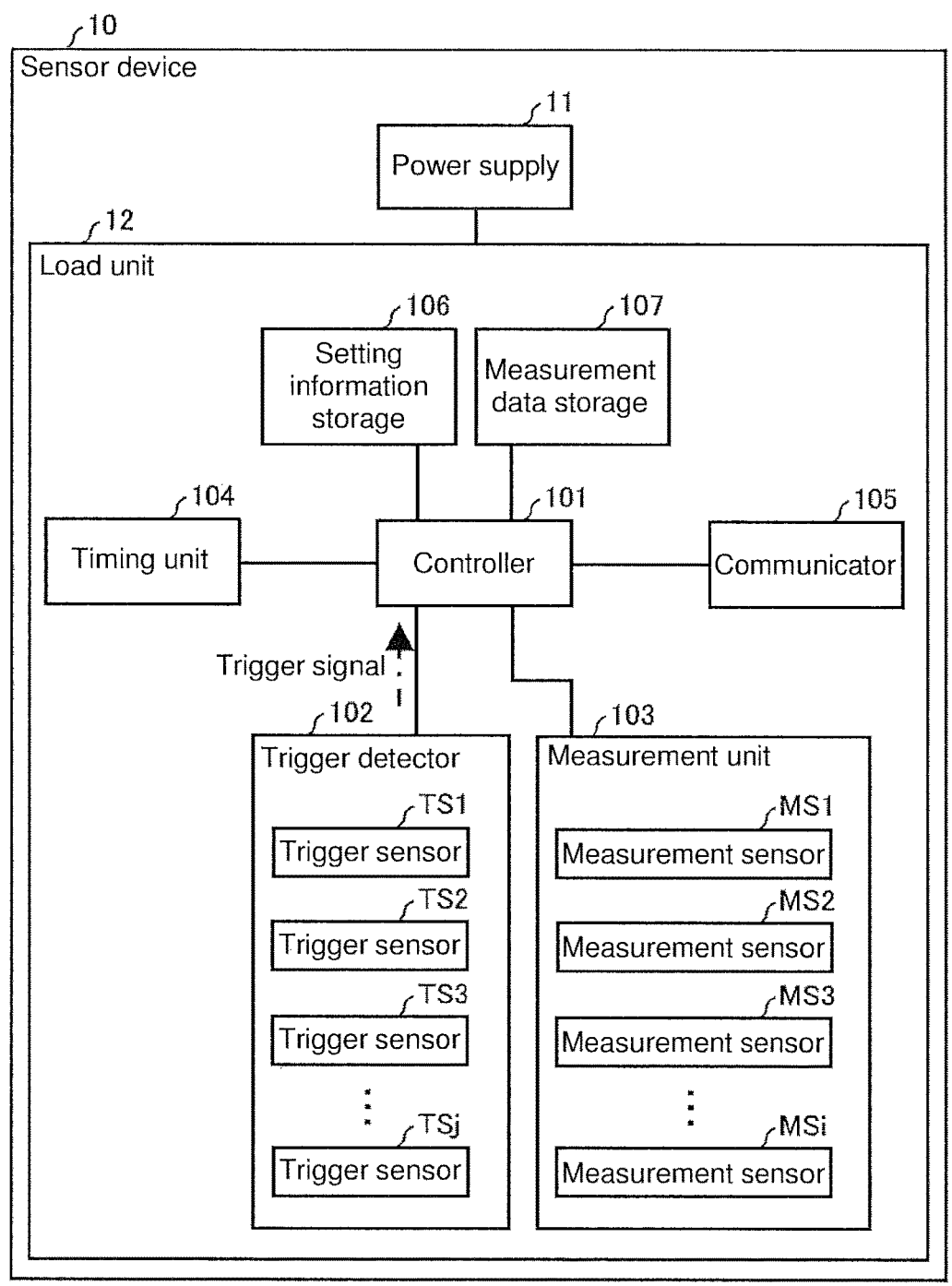
FIG. 8 is an explanatory view illustrating a schematic configuration of a sensor device according to a second embodiment of the present invention.

FIG. 8 is an explanatory view illustrating a schematic configuration of a sensor device 10 according to the second embodiment. The sensor device 10 of the first embodiment includes the one trigger sensor TS1. On the other hand, the sensor device 10 of the second embodiment includes plural kinds of trigger sensors TS1 to TSj (j is an integer of 2 or more) as illustrated in FIG. 8. The trigger sensors TS1 to TSj may detect the physical amounts different from each other (for example, the vibration sensor and the strain sensor) or the same kind of the physical amount. For example, the vibration sensor may be used as the trigger sensor TS1, and the strain sensor may be used as the trigger sensor TS2.

In the second embodiment, the one or plural trigger thresholds (trigger conditions) applied to each trigger sensor and the priority corresponding to the trigger threshold are stored in the setting information storage 106, and the controller 101 controls the measurement processing operation of the measurement unit 103 based on the detection result in the case that any one of the trigger sensors detects the trigger threshold.

FIG. 9 is an explanatory view illustrating a setting example of the trigger threshold and the priority in the case that the sensor device 10 includes the trigger sensors TS1 and TS2. In the example of FIG. 9, the first threshold (TS1) and the second threshold (TS1) are set to the trigger sensor TS1, the priority of the first threshold (TS1) is set to 1, and the priority of the second threshold (TS1) is set to 3. The first threshold (TS2) and the second threshold (TS2) are set to the trigger sensor TS2, the priority of the first threshold (TS2) is set to 2, and the priority of the second threshold (TS2) is set to 4. Substantially the same method as the first embodiment can be adopted as the method for controlling the operation of the measurement unit 103.

FIG. 10 is an explanatory view illustrating another setting example of the trigger threshold and the priority in the case that the sensor device 10 includes the trigger sensors TS1 and TS2. In the example of FIG. 10, the first threshold (TS1) and the second threshold (TS1) are set to the trigger sensor TS1, and the first threshold (TS2) is set to the trigger sensor TS2. Additionally, (i) the priority is set to 1 in the case that the trigger sensor TS1 detects the first threshold (TS1) while the trigger sensor TS2 does not detect the first threshold (TS2), (ii) the priority is set to 2 in the case that the trigger sensor TS1 detects the first threshold (TS1) while the trigger sensor TS2 detects the first threshold (TS2), (iii) the priority is set to 3 in the case that the trigger sensor TS1 detects the second threshold (TS1) while the trigger sensor TS2 does not detect the first threshold (TS2), and (iv) the priority is set to 4 in the case that the trigger sensor TS1 detects the second threshold (TS1) while the trigger sensor TS2 detects the first threshold (TS2). Substantially the same method as the first embodiment can be adopted as the method for controlling the operation of the measurement unit 103.

FIG. 11 is an explanatory view illustrating still another setting example of the trigger threshold and the priority in the case that the sensor device 10 includes the trigger sensors TS1 and TS2. In the example of FIG. 11, the first threshold (TS1) and the second threshold (TS1) are set to the trigger sensor TS1, and the first threshold (TS2) and the second threshold (TS2) are set to the trigger sensor TS2. Additionally, (i) the priority is set to 1 in the case that the trigger sensor TS1 detects the first threshold (TS1) while the trigger sensor TS2 detects the first threshold (TS2), (ii) the priority is set to 2 in the case that the trigger sensor TS1 detects the first threshold (TS1) while the trigger sensor TS2 detects the second threshold (TS2), (iii) the priority is set to 3 in the case that the trigger sensor TS1 detects the second threshold (TS1) while the trigger sensor TS2 detects the first threshold (TS2), and (iv) the priority is set to 4 in the case that the trigger sensor TS1 detects the second threshold (TS1) while the trigger sensor TS2 detects the second threshold (TS2). Substantially the same method as the first embodiment can be adopted as the method for controlling the operation of the measurement unit 103.

FIG. 12 is an explanatory view illustrating yet another setting example of the trigger threshold and the priority in the case that the sensor device 10 includes the trigger sensors TS1 and TS2. In the example of FIG. 12, the first threshold (TS1) and the second threshold (TS1) are set to the trigger sensor TS1, and the first threshold (TS2) and the second threshold (TS2) are set to the trigger sensor TS2. Additionally, (i) the priority is set to 1 in the case that the trigger sensor TS1 does not detect the first threshold (TS1) while the trigger sensor TS2 detects the first threshold (TS2), (ii) the priority is set to 2 in the case that the trigger sensor TS1 does not detect the first threshold (TS1) while the trigger sensor TS2 detects the second threshold (TS2), (iii) the priority is set to 3 in the case that the trigger sensor TS1 detects the first threshold (TS1) while the trigger sensor TS2 does not detect the first threshold (TS2), (iv) the priority is set to 4 in the case that the trigger sensor TS1 detects the first threshold (TS1) while the trigger sensor TS2 detects the first threshold (TS2), (v) the priority is set to 5 in the case that the trigger sensor TS1 detects the first threshold (TS1) while the trigger sensor TS2 detects the second threshold (TS2), (vi) the priority is set to 6 in the case that the trigger sensor TS1 detects the second threshold (TS1) while the trigger sensor TS2 does not detect the first threshold (TS2), (vii) the priority is set to 7 in the case that the trigger sensor TS1 detects the second threshold (TS1) while the trigger sensor TS2 detects the first threshold (TS2), and (viii) the priority is set to 8 in the case that the trigger sensor TS1 detects the second threshold (TS1) while the trigger sensor TS2 detects the second threshold (TS2). Substantially the same method as the first embodiment can be adopted as the method for controlling the operation of the measurement unit 103.

In each of the setting examples, the trigger threshold is set in each trigger sensor. Alternatively, for example, the trigger threshold may be set with respect to a combination of the detection values of the plural trigger sensors. Specifically, for example, a predetermined function f in which the detection values of the trigger sensors TS1 and TS2 are used as a variable and the plural trigger thresholds corresponding to the function f are previously fixed, and the operation of the measurement unit 103 may be controlled based on a comparison result between a value calculated from the function f and the trigger threshold according to the detection values of the trigger sensors TS1 and TS2. There is no particular limitation to the function f. For example, the function f may be an addition, a subtraction, a multiplication, a division, and a weighted addition of the detection values of the trigger sensors TS1 and TS2, or a combination thereof.

[Third Embodiment]

A third embodiment of the present invention will be described below. For convenience of the description, the member having the same function as the first and second embodiments is designated by the same numeral as the first and second embodiments, and the description is omitted.

In the configuration of the second embodiment, the trigger detector 102 of the sensor device 10 includes plural trigger sensors, and the measurement processing of the measurement unit 103 is controlled according to the detection results of the trigger sensors. On the other hand, in the third embodiment, the controller 101 of the sensor device 10 controls the measurement processing of the measurement unit 103 based on the detection result of each trigger sensor included in the sensor device 10 and the trigger signal input from the outside of the sensor device 10.

Figure 13:
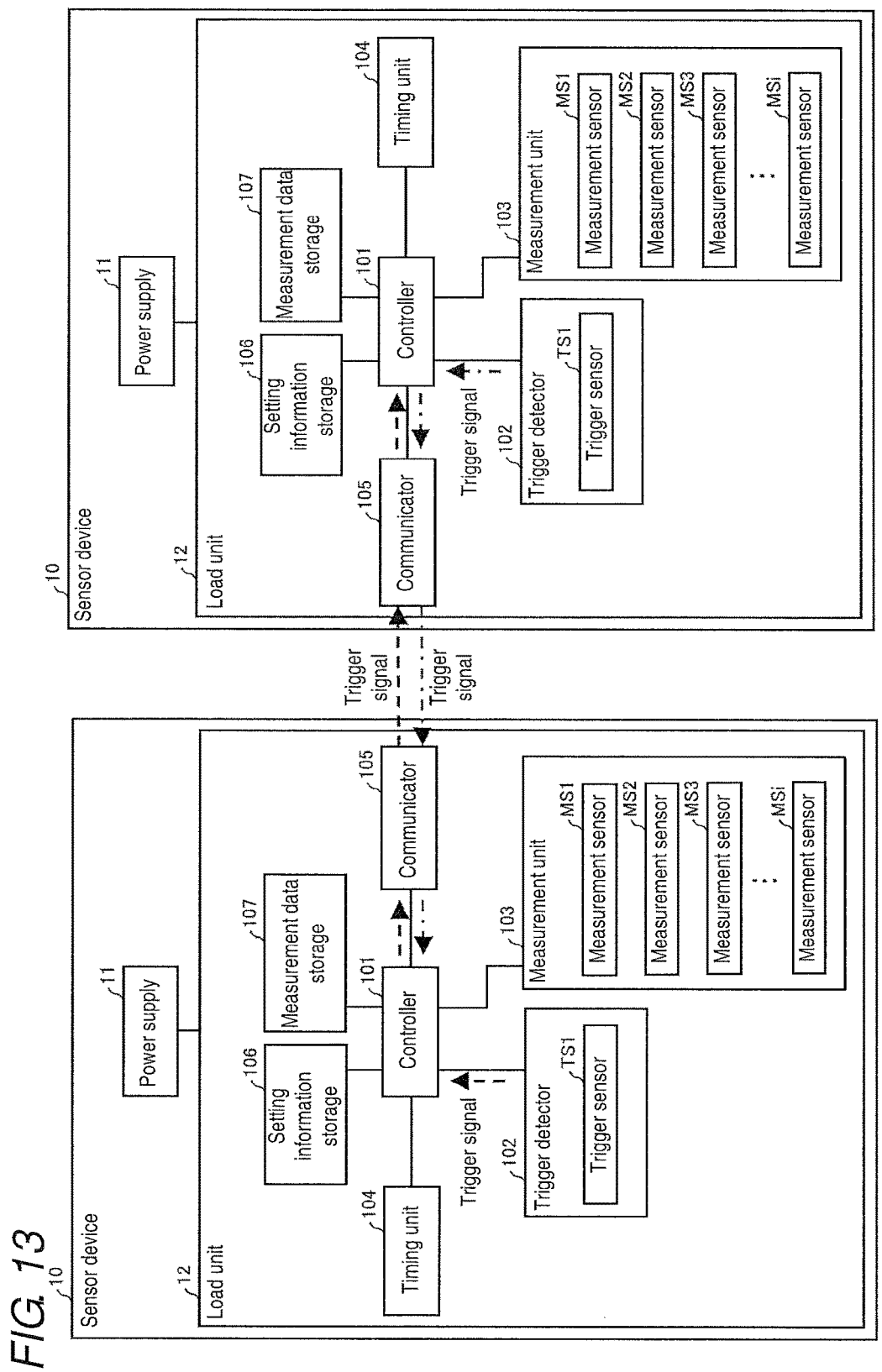
FIG. 13 is an explanatory view illustrating a schematic configuration of a sensor device according to a third embodiment of the present invention.

FIG. 13 is an explanatory view illustrating a schematic configuration of the sensor device 10 according to the third embodiment. As illustrated in FIG. 13, the sensor device 10 of the third embodiment has substantially the same configuration as the sensor device 10 of the first embodiment. However, as illustrated in FIG. 13, in the sensor device 10 of the third embodiment, the trigger signal (trigger information) is input to the controller 101 from the trigger detector 102 of the own device, the trigger signal (trigger information) received from another sensor device 10 by the communicator 105 is input to the controller 101, and the controller 101 controls the measurement processing of the measurement unit 103 based on the trigger signals. When receiving the trigger signal from the trigger detector 102 of the own device, the controller 101 transmits the trigger signal (trigger information) to another sensor device 10 through the communicator 105.

The trigger signal may be input to each sensor device 10 from the sensor devices 10 included in the measurement system 1, or the trigger signal may be input only from a part (for example, each sensor device installed in the same structure as the sensor device 10, a sensor device installed near the sensor device 10, or a sensor device previously assigned in the sensor devices 10 included in the measurement system 1) of the sensor devices 10 included in the measurement system 1. Each sensor device 10 may transmit the trigger signal to all the sensor devices 10 included in the measurement system 1, or each sensor device 10 may transmit the trigger signal to a part of the sensor devices 10 included in the measurement system 1.

FIG. 14 is an explanatory view illustrating a setting example of the trigger threshold (trigger condition) and the priority in the sensor device 10 of the third embodiment. In the example of FIG. 14, the first threshold and the second threshold are set to the trigger detector 102 (trigger sensor TS1) of each sensor device 10, the priority of the first threshold is set to 1 in the trigger detector 102 of the own device, the priority of the first threshold (the trigger signal indicating the detection of the first threshold in another sensor device 10) is set to 2 in the trigger detector 102 of the another sensor device 10, the priority of the second threshold is set to 3 in the trigger detector 102 of the own device, and the priority of the second threshold (the trigger signal indicating the detection of the second threshold in another sensor device 10) is set to 4 in the trigger detector 102 of the another sensor device 10. In the case that each of the trigger thresholds is detected, substantially the same method as the first embodiment can be adopted as the method for controlling the operation of the measurement unit 103.

In the example of FIG. 14, the trigger threshold set to each sensor device 10 is kept constant. Alternatively, the trigger threshold used to control the measurement processing of the own device may be different from the trigger threshold that is used in outputting the trigger signal to another sensor device 10 from the own device. In the case that the measurement processing is controlled based on the trigger signal received from another sensor device 10, the priority may be varied according to the sensor device 10 of a transmission source. For example, in the case that the transmission source is the sensor device 10 disposed near the own device, the priority is set higher than that of the case that the transmission source is the sensor device 10 disposed distant from the own device.

In the third embodiment, the transmission source of the trigger signal is another sensor device 10. Alternatively, for example, a trigger detection device (not illustrated) having a function of detecting a predetermined trigger condition and a function of communicating with the sensor device 10 is provided apart from each sensor device 10, and the trigger signal may be output to each sensor device 10 when the trigger detection device satisfies the trigger condition.

[Fourth Embodiment]

A fourth embodiment of the present invention will be described below. For convenience of the description, the member having the same function as the first to third embodiments is designated by the same numeral as the first to third embodiments, and the description is omitted.

In the third embodiment, the controller 101 controls the measurement processing of the measurement unit 103 based on the detection result of each trigger sensor included in the own device and the trigger signal input from the outside. On the other hand, in the fourth embodiment, the controller 101 controls the measurement processing of the measurement unit 103 based on the detection result of the trigger sensor included in the own device, the trigger signal input from the outside, and the signal input from the timing unit 104 included in the own device.

Figure 15:
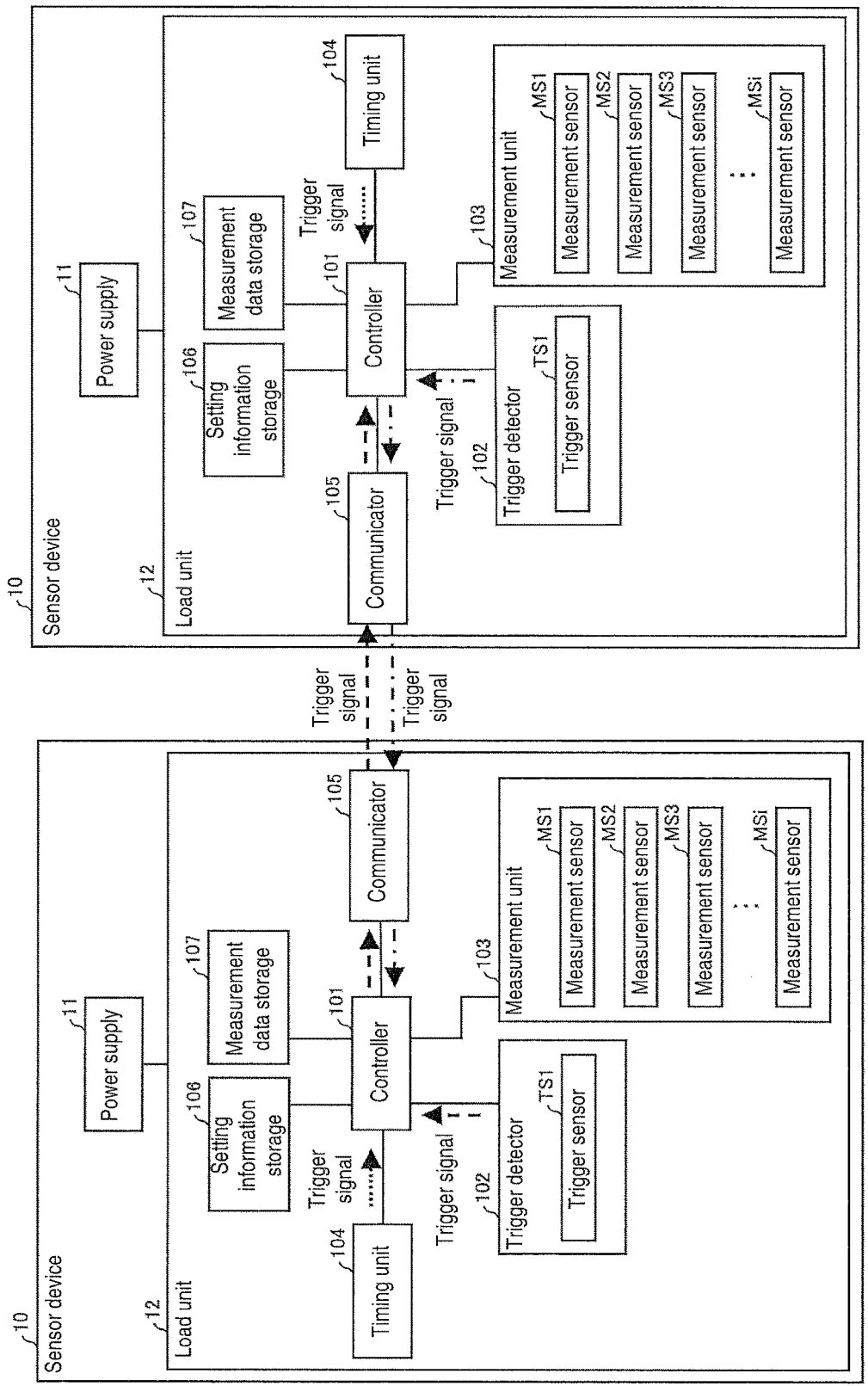
FIG. 15 is an explanatory view illustrating a schematic configuration of a sensor device according to a fourth embodiment of the present invention.

FIG. 15 is an explanatory view illustrating a schematic configuration of the sensor device 10 according to the fourth embodiment. As illustrated in FIG. 15, the sensor device 10 of the fourth embodiment has substantially the same configuration as the sensor device 10 of the second and third embodiments. However, as illustrated in FIG. 15, in the sensor device 10 of the fourth embodiment, the trigger signal (trigger information) is input to the controller 101 from the trigger detector 102 of the own device, the trigger signal (trigger information) received from another sensor device 10 by the communicator 105 is input to the controller 101, the trigger signal (trigger information) is input to the controller 101 from the timing unit 104 of the own device, and the controller 101 controls the measurement processing of the measurement unit 103 based on the trigger signals. When receiving the trigger signal from the trigger detector 102 of the own device, the controller 101 transmits the trigger signal to another sensor device 10 through the communicator 105.

In the sensor device 10 of the fourth embodiment, the trigger signal (timer interrupt signal) is output to the controller 101 when the timing unit 104 becomes a clock time previously assigned by the controller 101 (or when the time previously set by the controller 101 elapses).

FIG. 16 is an explanatory view illustrating a setting example of the trigger threshold and the priority in the sensor device 10 of the fourth embodiment. In the example of FIG. 16, the first threshold and the second threshold are set to the trigger detector 102 (trigger sensor TS1) of each sensor device 10. The priority of the first threshold is set to 1 in the trigger detector 102 of the own device, the priority of the first threshold is set to 2 in the trigger detector 102 of another sensor device 10, the priority of the trigger signal (timer interrupt) input from the timing unit 104 of the own device is set to 3, the priority of the second threshold is set to 4 in the trigger detector 102 of the own device, and the priority of the second threshold is set to 5 in the trigger detector 102 of another sensor device 10. In the case that each of the trigger thresholds is detected, substantially the same method as the first embodiment can be adopted as the method for controlling the operation of the measurement unit 103.

Thus, the measurement processing is started based on the trigger signal (timer interrupt) input from the timing unit 104, which allows the measurement target physical amount to be periodically measured in a predetermined time period. Specifically, for example, the measurement target physical amount associated with the vibration of the same time slot (for example, the time period of a large traffic volume) can daily be measured, the measurement target physical amount can be measured in the time period of a large solar radiation amount, or the measurement target physical amount can be measured in a predetermined time period on a specific day of the week.

In the fourth embodiment, the measurement processing is controlled based on the trigger signal (timer interrupt signal) input from the timing unit 104 of the own device. Alternatively, for example, the measurement processing may be controlled based on the trigger signal (timer interrupt signal) transmitted from another device including the timing unit. In this case, another device may be another sensor device 10, the data processing device 20, the data server 30, or the external server 40, or another device may be a device (not illustrated) different from another sensor device 10, the data processing device 20, the data server 30, and the external server 40.

[Implementation Example by Software]

The controller 101 of the sensor device 10 may be constructed with a logic circuit (hardware) formed in an integrated circuit (IC chip), or implemented by software using the CPU.

In the latter case, the sensor device 10 includes the CPU that executes a command of the program that is of software implementing each function, the ROM (Read Only Memory) or storage device (referred to as a "recording medium") in which the program and various pieces of data are readably stored, and the RAM (Random Access Memory) in which the program is expanded. The computer (or the CPU) reads the program from the recording medium to execute the program, thereby achieving the object of the present invention. A "non-transient physical medium" such as a tape, a disk, a card, a semiconductor memory, and a programmable logic circuit can be used as the recording medium. The program may be supplied to the computer through any transmission medium (such as a communication network and a broadcasting wave) that can transmit the program. The present invention can be implemented even in a mode of a data signal. The data signal is embedded in a carrier wave, and the program is provided by electronic transmission in the data signal.

[Summary]

According to one aspect of the present invention, a sensor device configured to measure a measurement target physical amount associated with a structure, the sensor device includes: a measurement unit configured to measure the measurement target physical amount; a trigger detector configured to detect a trigger physical amount; and a controller configured to control operation of the measurement unit according to a result of the trigger physical amount detected by the trigger detector. At this point, the controller switches the measurement unit from a non-measurement state to a measurement state to start measurement processing when a predetermined trigger condition is satisfied in plural trigger conditions set according to the trigger physical amount detected by the trigger detector, the controller sets a priority of each of the trigger conditions, and the controller interrupts currently-performed measurement processing to start measurement processing corresponding to a trigger condition having a higher priority when the trigger condition having the priority higher than that of the trigger condition corresponding to the currently-performed measurement processing is satisfied during the performance of the measurement processing.

In the above configuration, the measurement unit is maintained in the non-measurement state during the period in which the predetermined trigger condition is not satisfied, and the measurement unit is switched to the measurement state to perform the measurement processing when the predetermined trigger condition is satisfied, so that the running time of the measurement unit can be shortened to achieve the energy saving. When the trigger condition having the priority higher than that of the trigger condition corresponding to the currently-performed measurement processing is generated, the controller interrupts the currently-performed measurement processing to start the measurement processing corresponding to the trigger condition having the higher priority. Therefore, even if the event having the higher priority is generated during the measurement processing, the measurement target physical amount associated with the event can surely be measured.

The controller may set the priorities of the plural trigger conditions such that the priority of the trigger condition becomes higher with increasing trigger physical amount having a large variation amount for a steady state.

In the above configuration, when the trigger condition having the variation amount for the steady state larger than that of the trigger condition corresponding to the currently-performed measurement processing is satisfied, the currently-performed measurement processing is interrupted to start the measurement processing corresponding to the trigger condition having the larger variation amount for the steady state. Therefore, even if the event having the larger variation amount for the steady state is generated during the measurement processing, the measurement target physical amount associated with the event can surely be measured.

The trigger detector may output a predetermined trigger signal to the controller when the detected trigger physical amount reaches a trigger threshold set by the controller, the controller may determine whether the trigger condition corresponding to the trigger threshold is satisfied according to the trigger signal, and, when determining that the trigger condition is satisfied, the controller may update the trigger threshold set to the trigger detector to a trigger threshold having a larger variation amount for the steady state than that of the trigger threshold set at that time. The term "updates the trigger threshold to one having the larger variation amount for the steady state" means that the trigger threshold is updated such that a difference between the post-update trigger threshold and the physical amount during the steady state (for example, an average value of the physical amounts during the steady state) is larger than a difference between the pre-update trigger threshold and the physical amount during the steady state.

In the above configuration, every time the trigger detector detects the trigger threshold, the trigger threshold set to the trigger detector can be updated to the trigger threshold having the larger variation amount for the steady state. Therefore, for example, even if the trigger detector having only one settable trigger threshold is used, the trigger detector can detect the trigger threshold corresponding to the plural trigger conditions. Accordingly, a trigger detector having a relatively simple configuration can be used, so that cost reduction of the sensor device can be achieved.

The trigger detector may include plural kinds of trigger sensors, and the controller may set the trigger condition according to a combination of the trigger thresholds set to the trigger sensors.

In the above configuration, the trigger condition is set based on the plural kinds of the trigger sensor, which allows the operation of the measurement unit to be controlled based on various trigger conditions.

The controller may set a trigger condition that is set according to information input from a component different from the trigger detector in addition to the trigger condition that is set according to the trigger physical amount detected by the trigger detector.

In each above configuration, various conditions can be set as the trigger condition that controls the operation of the measurement unit.

The sensor device may include a timing unit configured to time a clock time or an elapsed time. At this point, the controller sets a part of the trigger condition while correlating the part of the trigger condition with the clock time or elapsed time timed by the timing unit.

In the above configuration, the measurement processing of the measurement unit can periodically be performed, or the measurement processing can be performed in predetermined timing.

The sensor device may include a communicator configured to communicate with another device. At this point, the controller sets a part of the trigger condition while correlating the part of the trigger condition with information received from another device by the communicator. Examples of the information received from another device include information transmitted from another device when the trigger physical amount detected by another device corresponds to a predetermined condition and a measurement processing starting instruction performed on another device by the manager of the sensor device.

In the above configuration, various conditions can be set as the trigger condition that controls the operation of the measurement unit.

The controller may set the measurement condition of the measurement processing according to the trigger condition corresponding to the measurement processing. The measurement condition may include a measurement time that is of a time until an end of the measurement processing since a start of the measurement processing. The measurement condition may include the measurement numerical range of the measurement target physical amount. The measurement condition may include the sampling period of the measurement target physical amount.

In each above configuration, the measurement condition is set according to the trigger condition, which allows the measurement processing to be properly performed according to the measurement purpose of each trigger condition.

The sensor device may include a measurement data storage in which measured data measured by the measurement unit is temporarily stored. At this point, when the currently-performed measurement processing is interrupted to start measurement processing corresponding to a trigger condition different from that of the currently-performed measurement processing, the controller deletes the measured data corresponding to the interrupted measurement processing from the measurement data storage.

In the above configuration, even if a storage capacity of the measurement data storage is restricted, the measured data corresponding to the trigger condition having the higher variation level can surely be stored in the measurement data storage.

The sensor device may include a communicator configured to perform transmission processing of transmitting the measured data acquired through the measurement processing to another device when the measurement unit completes the measurement processing of the measurement target physical amount. At this point, when a trigger condition having a priority higher than that of the trigger condition corresponding to the currently-transmitted measured data is satisfied during the transmission processing, the currently-performed transmission processing is interrupted to start the measurement processing corresponding to the trigger condition having the higher priority.

In the above configuration, in the case that the event having the priority higher than that of the currently-performed processing is generated during the transmission processing subsequent to the measurement processing, the measurement processing and transmission processing associated with the event can surely be performed.

The controller may set at least a part of the plural trigger conditions or the priority corresponding to at least the part of the plural trigger condition during a period in which the measurement unit performs the measurement processing different from at least the part of the plural trigger conditions or the priority corresponding to at least the part of the plural trigger condition during a period in which the communicator performs the transmission processing corresponding to the measurement processing.

In the above configuration, the trigger condition can be set according to the processing states of the measurement unit and communicator.

The controller may change the trigger condition according to a past measurement result of the measurement unit such that an occurrence frequency of the measurement processing falls within a predetermined range.

In the above configuration, the trigger condition can be automatically set such that the occurrence frequency of the measurement processing falls within the predetermined range, so that the increase in power consumption or measured data due to the excessive occurrence frequency can be prevented.

The sensor device may include a communicator configured to communicate with another device. At this point, the controller may change the trigger condition or the priority corresponding to the trigger condition based on information received from another device by the communicator.

In the above configuration, for example, the trigger condition or the priority can be changed according to the measurement result of another device, or the manager of the sensor device can remotely change the trigger condition or the priority through another device.

A measurement system of the present invention configured to measure a measurement target physical amount associated with a structure, the measurement system includes: any one of the above sensor devices; and a server device configured to receive measured data indicating a measurement result of the measurement target physical amount from the sensor device.

In the above configuration, the running time of the measurement unit of the sensor device can be shortened to achieve the energy saving. Even if the event having the higher priority is generated during the measurement processing, the measurement target physical amount associated with the event can surely be measured.

The measurement system may include plural sensor devices. At this point, at least a part of the plural sensor devices transmits trigger information to another sensor device when the trigger detector included in the sensor device detects a predetermined trigger physical amount, and a controller of another sensor device receiving the trigger information sets a trigger condition corresponding to the trigger information in addition to a trigger condition that is set according to a trigger physical amount detected by the trigger detector of the sensor device.

In the above configuration, the switching between the non-measurement state and the measurement state can be controlled in the measurement units of the plural sensor devices according to the detection result of the trigger physical amount in at least a part of the sensor devices.

A measurement method of the present invention for measuring a measurement target physical amount associated with a structure, the method includes the steps of: detecting the trigger physical amount; starting measurement processing of the measurement target physical amount by switching a measurement unit configured to measure the measurement target physical amount from a non-measurement state to a measurement state when a predetermined trigger condition is satisfied in plural trigger conditions set according to the trigger physical amount; setting previously a priority of each of the trigger conditions, and interrupting currently-performed measurement processing to start measurement processing corresponding to a trigger condition having a higher priority when the trigger condition having the priority higher than that of the trigger condition corresponding to the currently-performed measurement processing is satisfied during the performance of the measurement processing.

In the above method, the measurement unit is maintained in the non-measurement state during the period in which the trigger condition is not satisfied, so that the running time of the measurement unit can be shortened to achieve the energy saving. Even if the event having the higher priority is generated during the measurement processing, the measurement target physical amount associated with the event can surely be measured.

The present invention is not limited to the embodiments, but various changes can be made without departing from the scope of the present invention recited in claims. It is noted that the embodiment obtained by an appropriate combination of different embodiments is also included in the technical scope of the present invention. Additionally, a new technical feature can be formed by a combination of the technical units disclosed in the embodiments.

The present invention can be applied to the sensor device, the measurement system, and the measurement method for measuring the physical amount associated with the structure.

The invention claimed is:

1. A sensor device configured to measure a measurement target physical amount associated with a structure, the sensor device comprising:
   a measurement unit configured to measure the measurement target physical amount;
   a trigger detector configured to detect a trigger physical amount; and
   a controller configured to control operation of the measurement unit according to a result of the trigger physical amount detected by the trigger detector,
   wherein the controller switches the measurement unit from a non-measurement state to a measurement state to start measurement processing when a predetermined trigger condition is satisfied in a plurality of trigger conditions set according to the trigger physical amount detected by the trigger detector,
   the controller sets a priority of each of the trigger conditions, and
   the controller interrupts currently-performed measurement processing to start measurement processing corresponding to a trigger condition having a higher priority when the trigger condition having the priority higher than that of the trigger condition corresponding to the currently-performed measurement processing is satisfied during the performance of the measurement processing.

2. The sensor device according to claim 1, wherein the controller sets the priorities of the plurality of trigger conditions such that a trigger condition having a greater difference in trigger physical amount from a steady state is given a higher priority.

3. The sensor device according to claim 2, wherein the trigger detector outputs a predetermined trigger signal to the controller when the detected trigger physical amount reaches a trigger threshold set by the controller,
   the controller determines whether the trigger condition corresponding to the trigger threshold is satisfied according to the trigger signal, and
   when determining that the trigger condition is satisfied, the controller updates the trigger threshold set to the trigger detector to a trigger threshold having a larger variation amount for the steady state than that of the trigger threshold set at that time.

4. The sensor device according to claim 1, wherein the trigger detector includes a plurality of kinds of trigger sensors, and
   the controller sets the trigger condition according to a combination of the trigger thresholds set to the trigger sensors.

5. The sensor device according to claim 1, wherein the controller sets a trigger condition that is set according to information input from a component different from the trigger detector in addition to the trigger condition that is set according to the trigger physical amount detected by the trigger detector.

6. The sensor device according to claim 5, comprising a timing unit configured to time a clock time or an elapsed time,
    wherein the controller sets a part of the trigger condition while correlating the part of the trigger condition with the clock time or elapsed time timed by the timing unit.

7. The sensor device according to claim 5, comprising a communicator configured to communicate with another device,
    wherein the controller sets a part of the trigger condition while correlating the part of the trigger condition with information received from another device by the communicator.

8. The sensor device according to claim 1, wherein the controller sets a measurement condition of the measurement processing according to the trigger condition corresponding to the measurement processing.

9. The sensor device according to claim 8, wherein the measurement condition comprises a measurement time that is of a time until an end of the measurement processing since a start of the measurement processing.

10. The sensor device according to claim 8, wherein the measurement condition includes a measurement numerical value range of the measurement target physical amount.

11. The sensor device according to claim 8, wherein the measurement condition includes a sampling period of the measurement target physical amount.

12. The sensor device according to claim 1, comprising a measurement data storage in which measured data measured by the measurement unit is temporarily stored,
    wherein, when the currently-performed measurement processing is interrupted to start measurement processing corresponding to a trigger condition different from that of the currently-performed measurement processing, the controller deletes the measured data corresponding to the interrupted measurement processing from the measurement data storage.

13. The sensor device according to claim 1, comprising a communicator configured to perform transmission processing of transmitting the measured data acquired through the measurement processing to another device when the measurement unit completes the measurement processing of the measurement target physical amount,
    wherein, when a trigger condition having a priority higher than that of the trigger condition corresponding to the currently-transmitted measured data is satisfied during the transmission processing, the currently-performed transmission processing is interrupted to start the measurement processing corresponding to the trigger condition having the higher priority.

14. The sensor device according to claim 13, wherein the controller sets at least a part of the plurality of trigger conditions or the priority corresponding to at least the part of the plurality of trigger condition during a period in which the measurement unit performs the measurement processing different from at least the part of the plurality of trigger conditions or the priority corresponding to at least the part of the plurality of trigger condition during a period in which the communicator performs the transmission processing corresponding to the measurement processing.

15. The sensor device according to claim 1, wherein the controller changes the trigger condition according to a past measurement result of the measurement unit such that an occurrence frequency of the measurement processing falls within a predetermined range.

16. The sensor device according to claim 1, comprising a communicator configured to communicate with another device,
    wherein the controller changes the trigger condition or the priority corresponding to the trigger condition based on information received from another device by the communicator.

17. A measurement system configured to measure a measurement target physical amount associated with a structure, the measurement system comprising:
    a sensor device; and
    a server device,
    wherein the sensor device comprises:
        a measurement unit configured to measure the measurement target physical amount;
        a trigger detector configured to detect a trigger physical amount;
        a controller configured to control operation of the measurement unit according to a result of the trigger physical amount detected by the trigger detector;
        and a communicator configured to communicate with other devices,
    wherein the controller switches the measurement unit from a non-measurement state to a measurement state to start measurement processing when a predetermined trigger condition is satisfied in a plurality of trigger conditions set according to the trigger physical amount detected by the trigger detector,
    wherein the controller sets a priority of each of the trigger conditions, and
    wherein the controller interrupts currently-performed measurement processing to start measurement processing corresponding to a trigger condition having a higher priority when the trigger condition having the priority higher than that of the trigger condition corresponding to the currently-performed measurement processing is satisfied during the performance of the measurement processing,
    and wherein the server device is configured to receive measured data indicating a measurement result of the measurement target physical amount from the sensor device.

18. The measurement system according to claim 17, comprising a plurality of sensor devices,
    wherein at least a part of the plurality of sensor devices transmits trigger information to another sensor device when the trigger detector included in the sensor device detects a predetermined trigger physical amount, and
    a controller of another sensor device receiving the trigger information sets a trigger condition corresponding to the trigger information in addition to a trigger condition that is set according to a trigger physical amount detected by the trigger detector of the sensor device.

* * * * *